C. SPROD
Indicators for Water-Supply Pipes of Steam-Boilers.
No. 212,758. Patented Feb. 25, 1879.
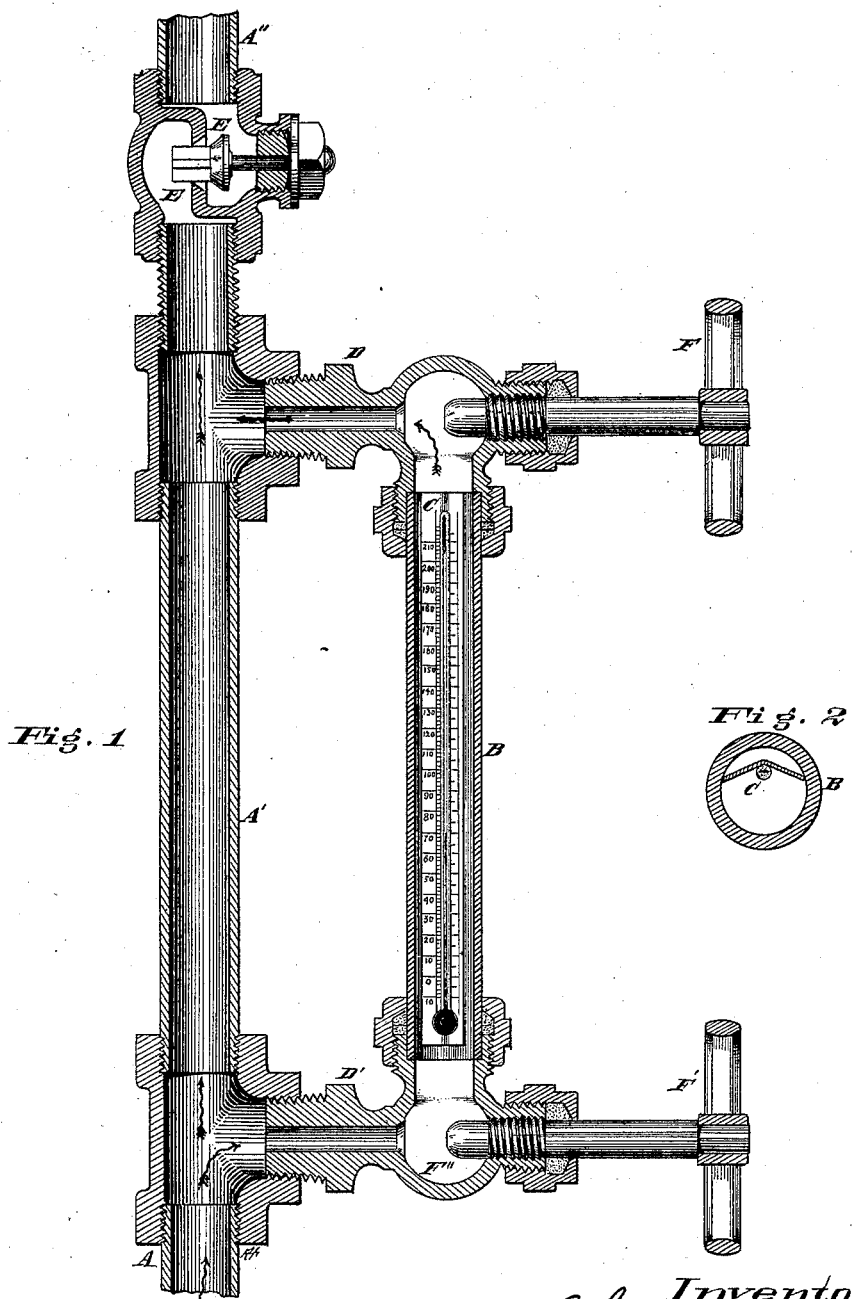

UNITED STATES PATENT OFFICE.

CHARLES SPROD, OF PHILADELPHIA, PENNSYLVANIA.

IMPROVEMENT IN INDICATORS FOR WATER-SUPPLY PIPES OF STEAM-BOILERS.

Specification forming part of Letters Patent No. 212,758, dated February 25, 1879; application filed November 11, 1878.

*To all whom it may concern:*

Be it known that I, CHARLES SPROD, of the city and county of Philadelphia, State of Pennsylvania, have invented a new and useful Improvement in Indicators for the Water-Supply Pipes of Steam-Boilers; and I do hereby declare the following to be a full, clear, and exact description of the same, reference being had to the annexed drawings, making part hereof.

The nature of my invention will be fully set forth in the accompanying specification and claims.

The object of my invention is to indicate the temperature of the water passing through a tube, as well as its clearness and the velocity at which it travels through the tube.

To enable others skilled in the art to make and use my invention, I will describe its construction and operation.

In the drawings, Figure 1 is a vertical sectional view of my apparatus; Fig. 2, a horizontal cross-section of the glass tube containing the thermometer.

A A' A'' is the main tube or water-conduit. B is the glass branch or switch-tube containing the thermometer C. D D' are simple tubular connecting-elbows and T bow-joints to unite the tubes A and B. E is a check-valve. F F' F'' are valves to shut off and open the flow of water through the tube B from the main tube A A' A''.

The operation is as follows: In practice that part of the main tube called A is connected with a force-pump, while the part A'' is connected with the interior of the steam-boiler which it is designed to keep supplied with water.

My invention is more especially adapted and intended to be used in cases where it is designed to supply the steam-boiler with water which is above the mean temperature.

The valves F and F' having first been opened, the pump is started, and water is forced through the pipe A. When it reaches that part of the main tube opposite to the joint D' the water separates into two streams, part of it passing directly up to the steam-boiler through pipe A A' A'', and part of it switching or branching off through joint D' up through tube B, where its temperature is indicated through the glass by the thermometer C, and back through the joint D to the main current, with which it unites, and the whole reunited current then passes into the steam-boiler. The check-valve E, which, as shown, is a horizontal valve, though a vertical one may be used, is designed to check or sustain the pressure of the steam from the boiler between the pulsations of the pump, or when the pump, from any cause, is at rest, thus avoiding any back steam-pressure upon the pump or the glass tube B.

If at any time it is desired to dispense with the use of the tube B, the valves F and F' are simply closed, thereby forcing the water up through the main tube A A' A''.

When vessels are at sea it is always desirable that as soon as the Gulf stream is reached it should be known. The temperature of this stream is much higher than that of the surrounding water. Now, the device above described can be used to discover this by simply having a tube arranged as described, or a simple single tube with a glass face in it, with an inner contained thermometer connected with the pumps which supply sea-water to the condensers of the steamship. The pump could be made to force a small jet of water through the pipe or glass tube, and thus indicate by the temperature of the water the instant almost that the Gulf stream is reached. The glass tube might be located either in the captain's or quartermaster's apartment, thus saving the trouble, risk, and uncertainty attendant upon the present method of discovering this—*i. e.*, dipping up a bucket of water at intervals every four hours at the changes of the "watches."

In the case of sailing-vessels the water could be forced through the pipe by taking it up by the velocity of the vessel through the water, locating the pipe's feed at the bow.

My invention is also specially useful in the steam testing of boilers—competitive tests. By connecting pipe A with various pipes from the steam-boilers, and passing steam instead of water through tube B, the various temperatures of steam produced could be easily indicated. Thus the relative capacities of the various boilers to produce steam of certain temperature from given quantities of fuel could be easily and readily estimated.

At the point F'' a cock and nozzle may be affixed, in order to clean out any sediment or dirt which might chance to lodge or settle in the tube B or valve F'. As the water passes up through tube B air-bubbles will be apparent in it, by means of which the velocity at which the water travels will be indicated, as well as the purity of the water itself.

My device may also be used to indicate the temperature of the air in heaters, furnaces, and that of water which is being supplied to bath-tubs, &c.

In practice I protect the mercury-bulb of the thermometer by means of a small metallic cup to break the force of the water, as the latter is projected against it. The bulb rests in this cup, either touching it, or nearly so, thus protecting the bulb from breakage resultant from the concussion of the jets of water at each pulsation of the pump.

Having thus described my invention, what I claim as new, and desire to secure by Letters Patent, is—

1. The combination, with a tubular water or steam conductor, A, of a transparent section of tubing, B, and thermometer C, substantially as and for the purposes described.

2. The combination of a tubular water or steam conductor, A, and a transparent tubular section, B, substantially as and for the purposes described.

3. The combination of a main tubular water or steam conductor, A, and a transparent branch or switch tubular conductor, B, substantially as and for the purposes described.

4. The combination of a tubular water or steam conductor, A, a transparent section of tubing, B, a thermometer, C, and a check-valve, E, substantially as and for the purposes described.

CHARLES SPROD.

Witnesses:
WM. J. FLINN,
GEORGE E. BUCKLEY.